United States Patent
Mitteer

(10) Patent No.: US 7,814,810 B2
(45) Date of Patent: Oct. 19, 2010

(54) SHIFTER WITH ACTUATOR INCORPORATING SHAPE MEMORY ALLOY

(75) Inventor: David M. Mitteer, Shelby, MI (US)

(73) Assignee: Grand Haven Stamped Products, a division of JSJ Corporation, Grand Haven, MI (US)

(*) Notice: Subject to any disclaimer, the term of this patent is extended or adjusted under 35 U.S.C. 154(b) by 319 days.

(21) Appl. No.: 11/772,972

(22) Filed: Jul. 3, 2007

(65) Prior Publication Data

US 2008/0006112 A1 Jan. 10, 2008

Related U.S. Application Data

(60) Provisional application No. 60/818,594, filed on Jul. 5, 2006.

(51) Int. Cl.
- *B60K 20/00* (2006.01)
- *G05G 5/00* (2006.01)
- *B60W 10/10* (2006.01)

(52) U.S. Cl. ............... 74/473.1; 74/473.23; 192/220.2

(58) Field of Classification Search ............. 74/473.21, 74/473.24, 473.25, 473.26, 473.1, 473.14, 74/473.15; 192/220.2, 220.3; 60/527, 528
See application file for complete search history.

(56) References Cited

U.S. PATENT DOCUMENTS

| | | | |
|---|---|---|---|
| 3,652,969 A | 3/1972 | Willson et al. |
| 4,275,370 A | 6/1981 | Sims |
| 4,699,235 A | 10/1987 | Anderson |
| 4,700,541 A | 10/1987 | Gabriel et al. |
| 4,754,734 A | 7/1988 | Ohkoshi |
| 4,761,955 A | 8/1988 | Bloch |
| 4,823,035 A | 4/1989 | Kudla et al. |
| 4,829,843 A | 5/1989 | Suzuki |
| 4,884,780 A | 12/1989 | Ohashi |
| 4,887,430 A | 12/1989 | Kroll et al. |
| 4,914,908 A | 4/1990 | Sugiyama et al. |
| 4,965,545 A | 10/1990 | Johnson |
| 4,979,672 A | 12/1990 | AbuJudom |
| 5,092,941 A | 3/1992 | Miura |
| 5,176,544 A | 1/1993 | AbuJudom |

(Continued)

FOREIGN PATENT DOCUMENTS

EP 1479921 11/2004

(Continued)

*Primary Examiner*—Thomas R Hannon
*Assistant Examiner*—Phillip A Johnson
(74) *Attorney, Agent, or Firm*—Price, Heneveld, Cooper, DeWitt & Litton, LLP

(57) ABSTRACT

A shifter includes an actuator incorporating a shape memory alloy wire to control movement of lever-position-controlling components of a vehicle transmission shift lever. In one arrangement, the actuator controls movement of a cam to prevent moving a pawl out of park position until predetermined vehicle conditions are met. Alternatively, the actuator can be directly attached to the pawl itself for controlling movement of the pawl, or connected to a toggle linkage arrangement for controlling movement of the pawl. In still another arrangement, a magnet arrangement is used to motivate a pawl-blocking member. When necessary, a mechanical fuse is operably connected to the system to prevent damage to the shape memory alloy wire where there is risk of the pawl being frictionally stopped from movement despite the contraction of the shape memory alloy wire actuator.

24 Claims, 8 Drawing Sheets

U.S. PATENT DOCUMENTS

| | | |
|---|---|---|
| 5,233,884 A | 8/1993 | Rochte |
| 5,417,487 A * | 5/1995 | Dahnert ..................... 312/201 |
| 5,419,788 A | 5/1995 | Thoma et al. |
| 5,771,742 A | 6/1998 | Bokaie et al. |
| 5,831,417 A * | 11/1998 | Chu .............................. 322/1 |
| 6,121,588 A | 9/2000 | Cerruti |
| 6,310,411 B1 | 10/2001 | Viallet |
| 6,364,496 B1 | 4/2002 | Boddy et al. |
| 6,374,608 B1 | 4/2002 | Corris et al. |
| 6,390,878 B1 | 5/2002 | Zhou et al. |
| 6,404,098 B1 | 6/2002 | Kayama |
| 6,459,855 B1 | 10/2002 | Kosaka et al. |
| 6,574,958 B1 | 6/2003 | MacGregor |
| 6,684,724 B2 | 2/2004 | Narasimhiah et al. |
| 6,732,516 B2 | 5/2004 | Butera et al. |
| 6,762,669 B2 | 7/2004 | Alacqua et al. |
| 6,813,886 B2 | 11/2004 | Cerruti et al. |
| 6,817,262 B2 | 11/2004 | Lewis et al. |
| 6,832,477 B2 | 12/2004 | Gummin et al. |
| 6,851,260 B2 | 2/2005 | Mernoe |
| 6,899,213 B1 | 5/2005 | Lohss |
| 7,213,483 B2 * | 5/2007 | Inoguchi et al. .......... 74/473.23 |
| 2004/0244524 A1 | 12/2004 | Russell |
| 2004/0261411 A1 | 12/2004 | MacGregor |
| 2005/0146147 A1 | 7/2005 | Niskanen |
| 2005/0160858 A1 | 7/2005 | Mernoe |
| 2006/0208500 A1 | 9/2006 | Brown |

FOREIGN PATENT DOCUMENTS

| | | |
|---|---|---|
| GB | 2148444 | 5/1985 |
| GB | 2182747 | 5/1987 |

* cited by examiner

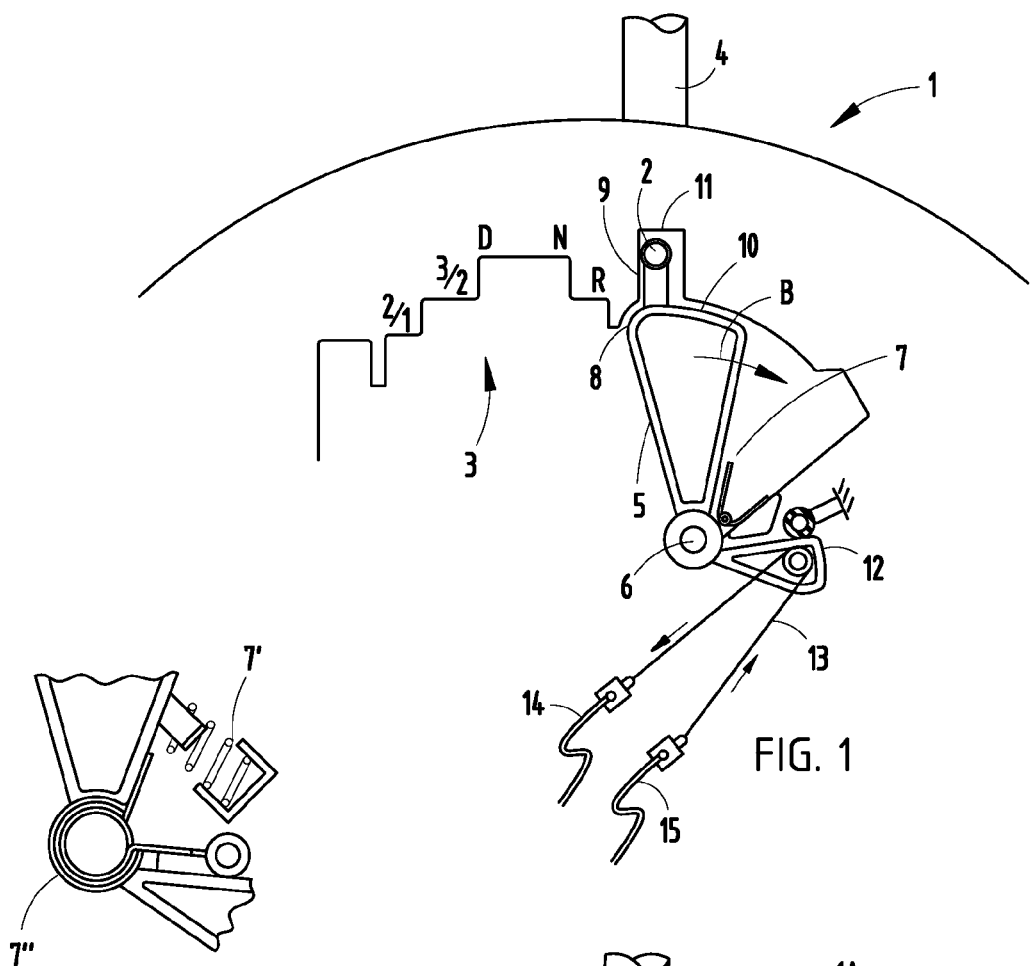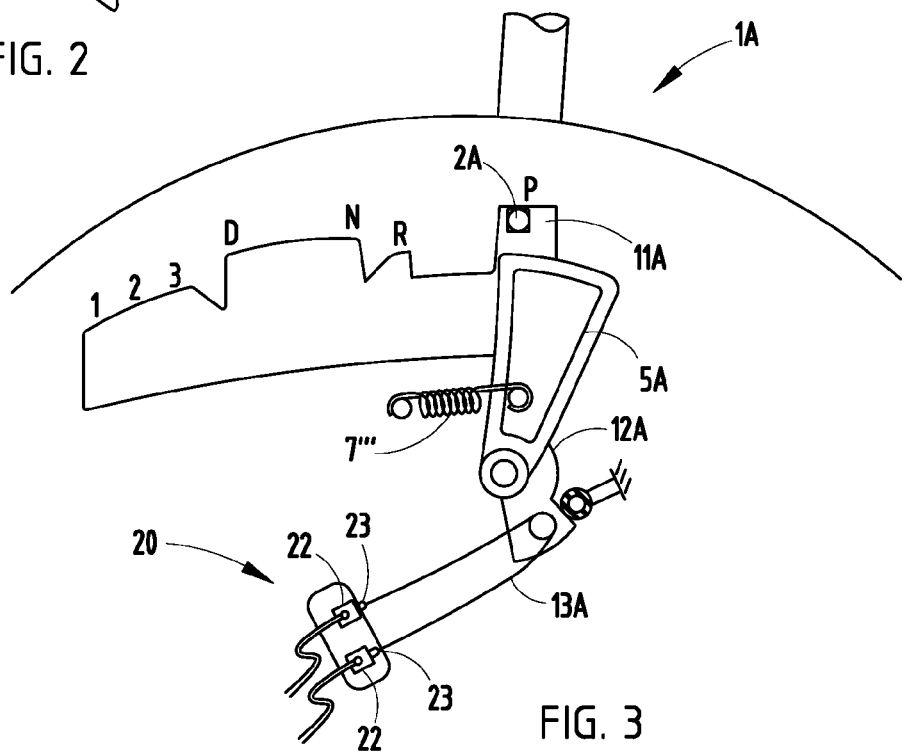

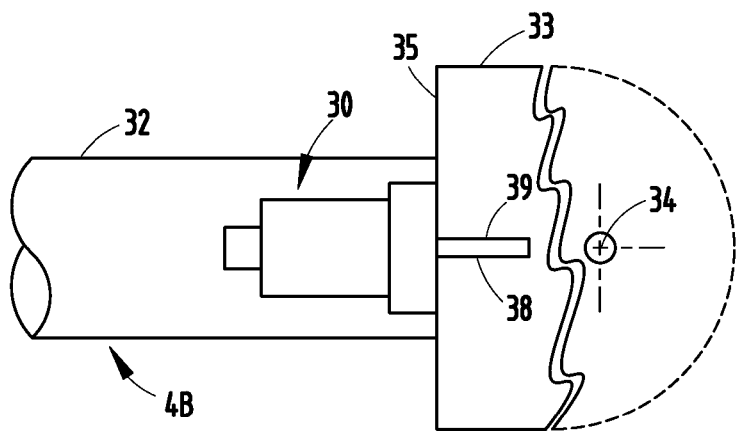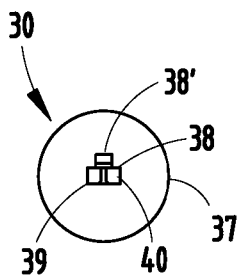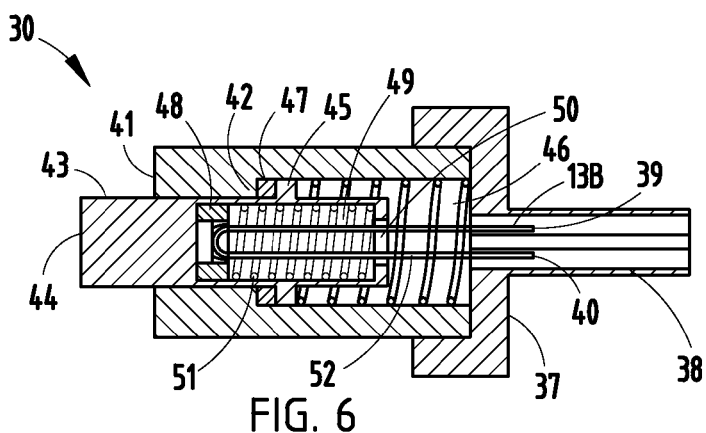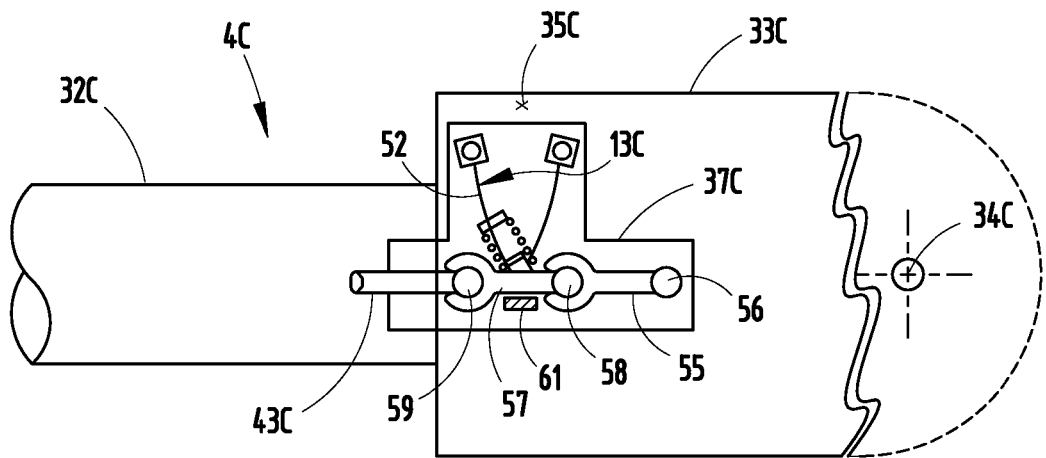

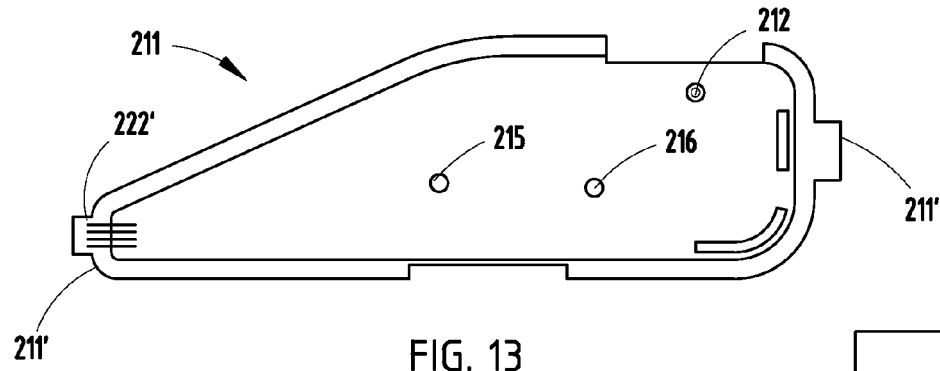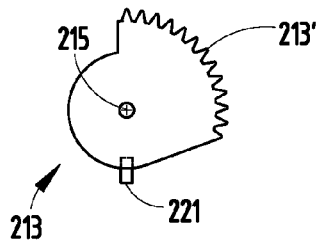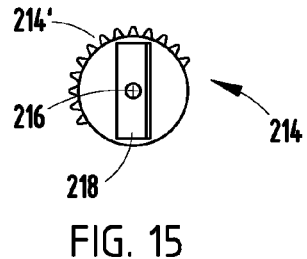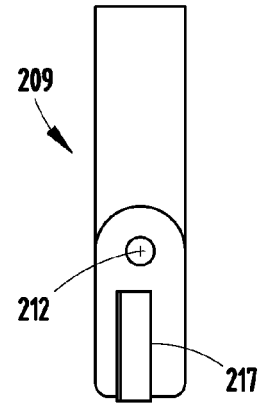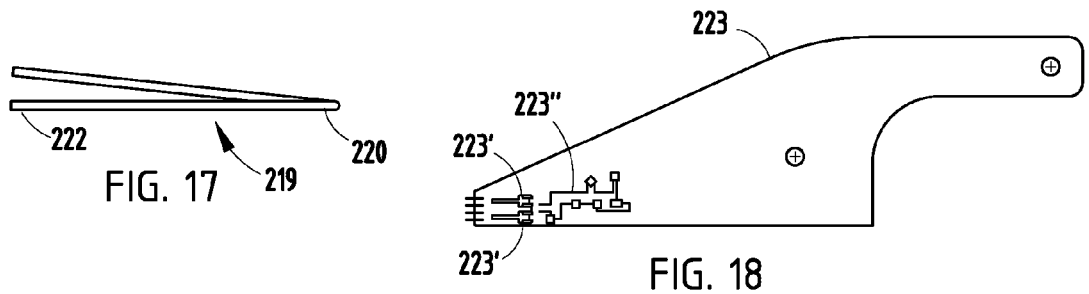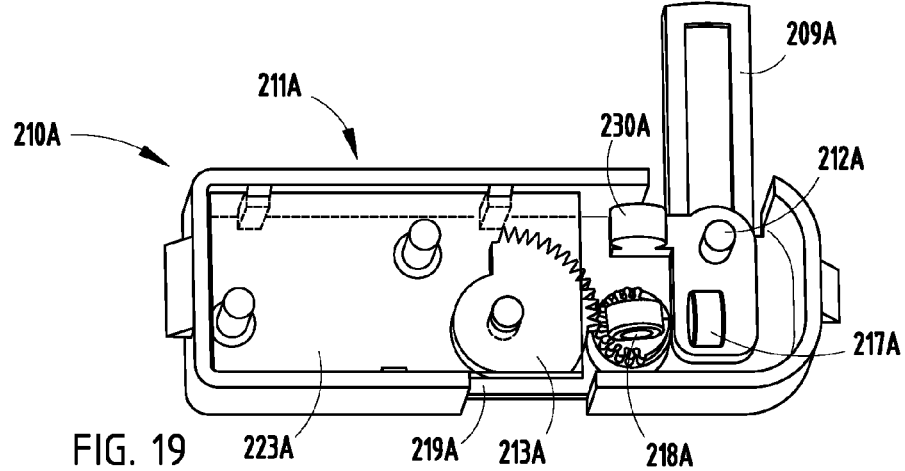

SHIFTER WITH ACTUATOR INCORPORATING SHAPE MEMORY ALLOY

CROSS-REFERENCE TO RELATED APPLICATIONS

This application claims benefit under 35 U.S.C. §119(e) of provisional application Ser. No. 60/818,594, filed Jul. 5, 2006, entitled SHIFTER WITH ACTUATOR INCORPORATING SHAPE MEMORY ALLOY, the entire contents of which are incorporated herein in their entirety. Further, this application is related to a utility application Ser. No. 11/772,984, filed on Jul. 3, 2007, entitled SHIFTER WITH ACTUATOR INCORPORATING MAGNETIC UNLOCK MECHANISM, the entire contents of which are incorporated herein in their entirety.

BACKGROUND

The present invention relates to vehicle transmission shifters with actuators incorporating a shape memory alloy wire and/or incorporating a magnetic lock/unlock mechanism to control movement of a shift lever, and more particularly relates to a shifter with shape memory alloy wire actuator and/or magnetic lock/unlock mechanism for controlling movement of a pawl out of a "park" position notch. However, it is contemplated that the present concept is not limited to only vehicle shifters with pawls, nor to only park lock systems, but instead is applicable for any lock/unlock mechanism where a blocking member must be selectively moved with an actuator occupying a minimum of space and preferably where the actuating mechanism has a minimum of components.

In brake transmission shift interlock mechanisms in automotive shift systems, it is desirable to either block the shift lever itself or block the shift lever's actuating pawl to prevent shifting of the shift lever from the Park position until the ignition key is in the "on" or "run" position and the brake is depressed. However, in an effort to provide these functions, shifters have often become complex, and relatively expensive components are used. Thus, component costs and manufacturing costs have increased significantly. For example, solenoids are often used to control movement of a park lock member that prevents the shifter's pawl from being removed from the Park position. However, solenoids are not inexpensive since they include copper coils and are associated with electromagnetic fields. Further, they require all of the operations associated with coiling insulated copper wire, stripping and terminating coils, electrically connecting the wires to a power source, assembling the solenoid as a preassembled unit, and assembling the solenoid into a shifter. Also for example, some recent shifters incorporate an electrical-actuator-driven pawl onto the shift lever for controlling movement of the shift lever. These actuator-driven pawls typically include a solenoid or electromechanical device operably connected to the pawl member for moving the pawl member into and out of notches representing gear positions. Still further, coils require a significant amount of dimensional space. Recent shifter designs are requiring a reduction in the three-dimensional space occupied by the shifters, and by the shift lock mechanisms.

It is desirable to produce an improved simple, cost-effective electrical actuating device that does not require the complexity of copper coils and associated electromagnetic fields, does not require electromagnetic field collapse energy and associated voltage spikes, and that does not require mechanical processing associated with coiling insulated copper wire, stripping and terminating coils. Further, a smaller design package is desired.

Pawl-engaging park-lock mechanisms in shifters sometimes require an extra force to initiate movement of the blocking member. This can be caused by a number of different things, such as initial mechanical static friction, by excess friction caused by the vehicle driver pulling on the shifter lever or pawl prior to movement of the blocking member, and other reasons. A compact arrangement is desired that provides an initial high-energy "kick" force to initiate movement of the blocking member, yet that fits within a very small dimensional space.

SUMMARY OF THE PRESENT INVENTION

An improvement is provided for a park lock/brake transmission shift interlock apparatus on a vehicle transmission shifter, where the apparatus includes a shape memory alloy wire actuator for controlling movement of a lever-position-controlling component for in turn controlling movement of a shift lever. For example, the actuator can be operably connected to a pawl on the shift lever, or to an interlock for the pawl, or to an interlock cam for locking the shift lever.

In one form, the improvement includes a shape memory alloy wire actuator operably connected to a control circuit and to the pawl for moving the pawl between a locking position for engaging the pawl with a selected one of the notches and a release position retracting the pawl to allow movement of the shift lever between the gear positions.

In another form, the improvement includes a shape memory alloy wire actuator operably connected to a control circuit and to linkage for moving the pawl for moving the linkage between a locking position for engaging the pawl with a selected one of the notches and a release position to retract the pawl to allow movement of the shift lever between the gear positions.

In another form, the improvement includes a shape memory alloy wire actuator operably connected to a control circuit and to a blocking member for moving the blocking member between a locking position for retaining the pawl in a selected one of the notches and a release position allowing movement of the pawl out of the selected one notch to allow the shift lever to move between the gear positions.

In another form, the improvement includes a shape memory alloy wire actuator operably connected to a control circuit and to a blocking member for moving the blocking member between a locking position retaining the shift lever in a selected one of the gear positions and a release position allowing movement of the shift lever between the gear positions.

In another aspect, the present invention includes a method of controlling a shifter having lever-position-controlling components, comprising a step of passing controlled amounts of electrical current through a shape memory alloy wire actuator to change a length of the wire based on current flow in order to control a position of at least one of the lever-position-controlling components.

In one aspect, a park lock/brake transmission shift interlock apparatus is provided including a base, a shift lever pivoted to the base for movement between a plurality of gear positions including a park position, a pawl on the shift lever selectively engageable with notches on the base to control movement of the shift lever between the gear positions, a lever-position-controlling component, and a control circuit for controlling operation of the shifter based on predetermined vehicle conditions being met. An improvement includes providing an actuator for operating the lever-position-controlling component, the actuator incorporating shape memory alloy wire operably connected to the control circuit and to the lever-position-controlling component for locking the shift lever in a selected one of the gear positions until the predetermined vehicle conditions are met.

In another aspect, an actuator is provided for an apparatus including a blocking member movable between a locked first position and an unlocked second position, and a drive mechanism for motivating the blocking member. The actuator includes at least two permanent magnets, a first one of the magnets being affixed to the blocking member, a second one of the magnets being operably connected to the drive mechanism. An actuator including at least one shape memory alloy wire is coupled to the drive mechanism to move the second magnet when a length of the wire changes. A circuit is connected to the actuator for applying electrical current through the wire to energize the wire and cause a material phase transition so that the wire changes length to move the second permanent magnet to a position where the second magnet magnetically biases the first permanent magnet, thereby causing the blocking member to move between the first position and the second position.

In still another aspect, an improved actuator is provided for an apparatus including a blocking member for blocking movement of another component and a drive mechanism for motivating the blocking member to move between a locked first position and an unlocked second position. The improved actuator includes at least three permanent magnets, a first one of the magnets being affixed to the blocking member, second and third of the magnets being affixed to the drive mechanism and being offset from each other, with the second magnet being in magnetic communication with the first magnet when the blocking member is in the first position. A carrier is provided for the magnets that is operatively coupled to at least one length of shape memory alloy wire, and that includes a circuit for applying current to energize the shape memory alloy wire when predetermined conditions are met. The shape memory alloy wire when energized undergoes a length change, resulting in the carrier moving, which in turn places the third magnet into magnetic communication with the first magnet on the blocking member in a manner causing the blocking member to move between the first position and the second position.

In still another aspect, an actuator includes a drive mechanism, a blocking member arranged to block movement of a lock mechanism, and at least three permanent magnets, a first one of the magnets being affixed to a shaft member of the drive mechanism, the other two magnets being offset from each other and affixed to the blocking member. A circuit including at least one length of shape memory alloy wire is coupled to the drive mechanism so that a change in length of the shape memory alloy wire causes the shaft member to move, thereby moving the first permanent magnet between a first position in magnetic communication with the second magnet, and a second position in magnetic communication with the third magnet, such that the blocking member is magnetically driven by the driving mechanism between the first position and the second position.

An object of the present invention is to take advantage of metallurgical technologies associated with thermal events to induce motion, commonly referred to collectively as "shape memory alloys."

An object is to claim shape memory alloys in any actuator mechanism, but in particular to shifter gear lock mechanisms, and to shifter park lock/brake transmission shift interlock actuator mechanisms.

These and other aspects, objects, and features of the present invention will be understood and appreciated by those skilled in the art upon studying the following specification, claims, and appended drawings.

BRIEF DESCRIPTION OF DRAWINGS

FIG. 1 is a fragmentary side view of a shifter incorporating a cam lock for locking the shifter's pawl in a park position, and including an actuator for controlling movement of the cam lock, the actuator including a part made of a shape memory alloy (SMA).

FIG. 2 is a fragmentary view showing use of a second biasing arrangement for the cam lock.

FIG. 3 is a fragmentary side view of a modified shifter similar to FIG. 1 but including a mechanical device providing strain relief to the shape memory alloy (SMA).

FIGS. 4-5 are side and end views of a modular pawl assembly.

FIG. 6 is a cross section through FIG. 4, showing details of a housing, a pawl, a main pawl-biasing spring, an actuator member of shape memory alloy, a secondary spring for preventing over-stress on the actuator member, and an electrical connector.

FIG. 7 is a cross section of an assembly similar to that of FIG. 4, but incorporating a toggle linkage into the pawl actuator.

FIGS. 13-18 are side views of the housing, drive gear, driven gear, locking member, shape-memory-alloy wire, and circuit board, respectively, in FIG. 9.

FIGS. 19-26 are side schematic views of modified lever-position-controlling components.

DETAILED DESCRIPTION OF PREFERRED EMBODIMENTS

Figure 8:
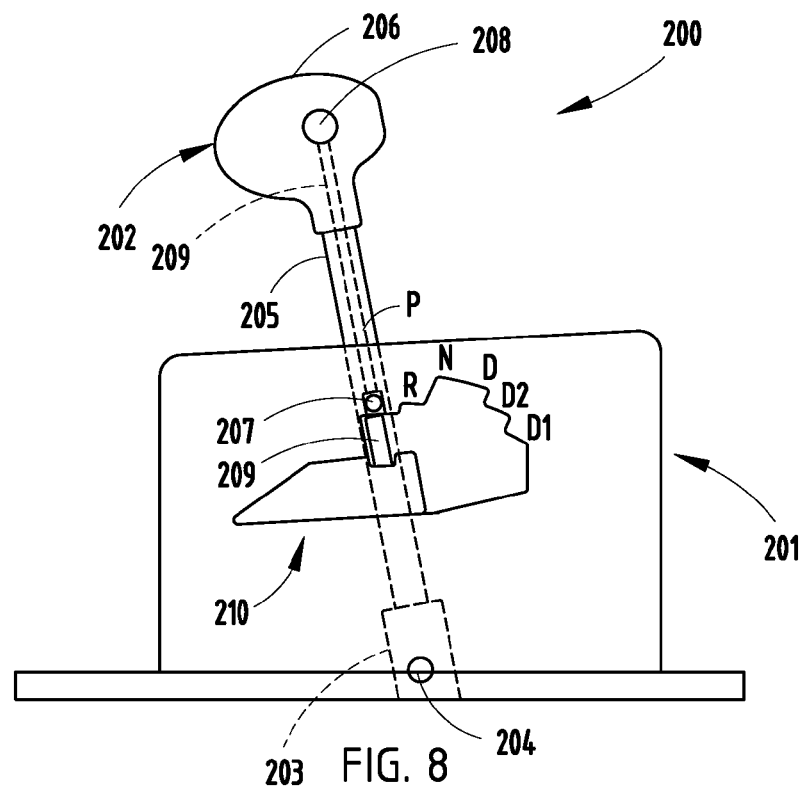
FIG. 8 is a side view of a shifter assembly using a lever-position-controlling component of the present invention.

A shifter 1 (FIG. 1) embodying the present invention includes a pawl member 2 (also called a "blocking member" herein) that engages notches (representing park, reverse, neutral, drive gear positions) in a shift gate 3 to control movement of shift lever 4. A park lock cam 5 is rotatably mounted to a pivot 6, and a spring 7 or the like biases the upper end 8 of cam 5 into stop surface 9 of shift gate 3. When the park lock cam 5 is in the position "A," the upper surface 10 of park lock cam 5 prevents movement of pawl 2 out of park notch 11. Notably, the illustrated spring 7 is a leaf spring, but it is contemplated that it can be another spring, such as the compression spring 7' or torsion spring 7" (FIG. 2) or coil spring 7''' (FIG. 3).

Notably, both the pawl member 2 and the cam lock 5 are shift-lever-controlling members, and also each are referred to as "blocking members" since they each perform a blocking function. (i.e., The pawl member blocks the shift lever from moving until it is operated, and the cam lock blocks the pawl from moving which in turn prevents the shift lever from being moved until the cam lock is operated.)

An arm 12 connected to cam 5 extends from pivot 6, and an actuator incorporating a wire 13 made of shape memory alloy (hereafter called "SMA wire 13") is connected to arm 12. Electrical wires 14 and 15 supply electrical current to the SMA wire 13 when the vehicle ignition switch is in the "on" position and the vehicle brake pedal is depressed, thereby contracting the wires 13 and in turn rotating the park lock cam 5 about pivot 6 as indicated by the arrow "B." After the park lock cam 5 has been rotated sufficiently, the cam 5 no longer blocks the pawl 2, such that the pawl 2 can be moved out of the park notch 11, and the shift lever 4 can be moved to a different gear position.

Shape memory alloy wire (SMA wire) is material technology developed that takes advantage of metallurgical thermal events to induce motion. These materials are commonly referred to collectively as "shape memory alloys." SMA wire is available commercially, such as Flexinol® material available from Dynalloy, Inc. (which can be found on the internet). In SMA wire, a controller controls electrical current through the SMA wire to control its temperature, and in turn control material phase change and hence the amount of shrink or extension of the wire.

In shifter 1A and the following shifters, similar numbers are used for identifying similar or identical components, but with the addition of the letter "A" or "B" or "C." This is done to reduce redundant discussion.

The shifter 1A (FIG. 3) is similar to the shifter 1 (FIG. 1), but includes a mechanical strain relief mechanism 20 in order to prevent overstressing and fracturing the SMA component. The relief mechanism 20 allows the SMA wire 13A to contract even when there is frictional pressure on the pawl 2A (i.e., blocking member) such that the pawl 2A itself cannot be retracted. Thus, the relief mechanism 20 is basically a mechanical fuse, preventing the SMA wire 13A from breaking due to over-stress. In particular, the illustrated relief mechanism 20 includes a slide connection made of slide pins 22 and mating slots 23 at the terminal end of the actuator. It is contemplated that the relief mechanism 20 will be reset when the pawl 2A is no longer frictionally bound (such as when a vehicle driver stops pulling rearwardly on the shifter when the pawl is still in the park notch 11A). The reset of the relief mechanism 20 can be automatic (such as with a biasing spring or timer) or can be manually performed (such as with a mechanical lever or button). It is contemplated that the blocking member (i.e., cam 5A and/or arm 12A) can be positioned to engage the shift lever directly, instead of acting to engage the pawl.

Further, it is contemplated that the blocking member (i.e., cam 5A) can be positioned on the base, or attached to the shift lever itself to travel with the shift lever during shifting movement, if desired. For example, it is envisioned that the blocking member could be positioned in the handle at a top of the shift lever, to prevent actuation of the thumb button on a shifter handle for mechanically moving the pawl. The use of a thumb button on shifter handles is a design often used in vehicle shifters, such that a person of ordinary skill will understand how to construct this arrangement based on the present disclosure without a detailed explanation. For reference, see FIG. 2 in U.S. Pat. No. 5,494,141 which shows a typical thumb button on a shifter. The blocking member would be positioned, for example, to move vertically upwardly into the cavity within the handle (or into engagement in a pocket in the button itself) in a manner preventing depression/movement of the thumb button until such time as predetermined vehicle conditions are met.

In park lock mechanisms, it is not uncommon for the user to apply an adverse "preventive" load, typically shear, to the blocking member such that the force required to move the blocking member is excessive. For example, a vehicle driver may pull rearward on the shift lever prior to pressing the button for disengaging the shifter's pawl from a notch defining the park position . . . making it more difficult for the vehicle mechanisms to move the pawl out of the park notch. Typical solenoids can accommodate this "increased force requirement" through maintained electromagnetic fields. However, since shape memory alloy actuators are a physical displacement driven by metallurgical thermal phenomenon, prevention of actuation via shear load would yield and ultimately break the SMA wire actuator. This is addressed in the present design of shifter 1A (FIG. 3) by placement of a torsional spring (called a mechanical fuse, or a compensating device) at location 6A which allows the cam 5A to remain stationary and the SMA wire actuator to shorten (i.e., when the SMA wire 13B of the relief mechanism 20 is actuated but when there are frictional forces operating on the cam to prevent its movement). It is also addressed in the present design of pawl module 30 (FIG. 5) by adding a secondary intermediate spring to act as a mechanical fuse (also called a compensating device) such that the actuator will compress the secondary spring while the primary spring remains extended, until such time as the preventive load is removed from the blocking member. When the load is removed from the blocking member, the secondary spring will expand, causing the primary spring to compress against the force of the actuator, and causing the blocking member to retract, as discussed below in more detail.

A pawl module 30 (FIGS. 4-6) incorporates a shape memory alloy (SMA) wire 13B and is attachable to a shift lever 4B as follows. The shift lever 4B includes a shift post 32 with molded-on pivot member 33 defining a pivot axis 34 and a platform 35. The pawl module 30 includes a tubular base 37 having a protruding connector 38 with a barb 38' for mechanically frictionally engaging a mating socket in the platform 35 and a pair of electrical contacts 39 and 40 for electrically connecting to wiring in the platform 35, the wiring being operably connected to a shift control processor in the vehicle. Pawl housing 41 is supported on base 37 and includes a top opening defined by inwardly directed flange 42. A pawl 43 (also called a "blocking member") includes a tip 44 that protrudes through the opening and is configured to engage notches that define gear positions of the shifter. The pawl 43 further includes an annular ring 45 that abuts an inner surface of the flange 42. A main spring 46 engages the ring 45 and biases the pawl 43 to an extended position. A resilient ring dampener 47 dampens extension of the pawl 43 as the annular ring 45 approaches the flange 42, thus preventing a clicking noise. A portion of the pawl 43 is hollow and defines a cavity 49 and an opening 50 into the cavity 49 at the connector end of the pawl 43. A sliding pilot member 48 is positioned within the cavity 49 at an opposite end of the cavity 49, and is biased toward the opposite end by a secondary spring 51. The secondary spring 51 has one end abutting the pilot member 48 and the other end abutting the inward flange forming the opening 50 at the connector end of the module 30. The SMA wire 13B forms a loop 52 that extends from the electrical contacts 39 and 40 through the opening 50 and longitudinally through the cavity 49 and then loops over a transverse pin in the pilot member 48.

When electrical current is passed through the SMA wire 13B, it is heated and contracts, pulling the sliding pilot member 48. As the pilot member 48 is pulled, the pilot member 48 moves toward the secondary spring 51 and the secondary spring 51 causes the pawl 43 to retract. When the pawl 43 retracts, the main spring 46 is compressed.

If the pawl 43 is frictionally bound and unable to move (such as if a vehicle driver is pulling rearwardly on the shift lever prior to actuation of the SMA wire 13B), the SMA wire 13B still contracts, and the pilot member 48 still moves toward the secondary spring 51. However, since the pawl 43 is frictionally bound and unable to move, it is the secondary spring 51 that compresses (i.e., the pilot member 48 moves toward the end forming the opening 50) . . . while the main spring 46 remains temporarily in a static condition. Thus, the spring 51 acts as a "strain relief mechanism" or a mechanism fuse to prevent the SMA wire from breaking. Once the pawl 43 is released from being frictionally bound, the secondary spring 51 decompresses, the pilot member 48 moves to its home position, and the pawl 44 retracts as the main spring 46 compresses. Notably, the secondary spring 51 is slightly stronger than the main spring 46 so that if the pawl 43 is free to move, it is the main spring 46 that compresses and the secondary spring 51 does not compress.

It is contemplated that the housing for the SMA actuator can be attached to the base or to the shift lever. A shifter having a detent-forming component attached to a base and also a shifter having a molded-on pivot member can be found in existing patents, such as Osborn U.S. Pat. No. 5,277,077, the entire contents of which are incorporated herein in their entirety. It is contemplated that the housing for the SMA actuator can be incorporated into either of these molded components, or attached as a separate component to either the base or the shift lever.

A second pawl module 30C (FIG. 7) incorporates a shape memory alloy (SMA) wire 13C and is attachable to a shift lever 4C as follows. The shift lever 4C includes a shift post 32C with molded-on pivot member 33C defining a pivot axis 34C and a platform 35C. The pawl module 30C includes a base 37C attached to the pivot member 33C. A pawl 43C is attached to a toggle linkage comprising a first link 55 pivotally anchored at a stationary pivot 56, and a second link 57 pivoted to first link 55 at pivot 58 and to a trailing end of the pawl 43C at pivot 59. The SMA wire 13C includes a loop 52C that extends around a transverse pin 53C and two legs that extend to electrical contacts 39C and 40C. A bias spring 60 biases the links 55 and 56 to an aligned position where the pawl 43C is extended. When current passes through the SMA wire 13C, the wire 13C contracts and pulls the links 55 and 56 out of alignment. This causes the pawl 43C to retract. It is noted that the arrangement pulls the pawl 43C with considerable mechanical advantage at the initial stage of movement. This can be very desirable, which is why the toggle system has had significant success in the market place. The present arrangement gives the SMA wire 13C this same advantage. When current through the SMA wire 13C is stopped, the spring 60 biases the toggle links 55 and 57 back to an aligned position, thus locking the pawl 43 in a home position. Notably, the links 55 and 57 pass slightly over center, such that a high force cannot overcome the locked condition. A stop 61 holds the links 55 and 57 at their locked positions and prevents them from moving "too far" over center. In a toggle-type assembly, a pre-load release mechanism is achieved through toggle links and through mechanical advantage. The SMA actuator both simplifies the actuator mechanism by reducing size and complexity. The toggle-type mechanism has very low load and travel requirements to collapse the toggle, which is ideally suited to SMA wire. In this arrangement, the need for a mechanical fuse is eliminated as the fuse is integral to the toggle assembly.

For additional information on a park lock system using a toggle linkage, see Osborn U.S. Pat. No. 5,494,141, and for additional information on a pawl actuated system using a toggle linkage see Osborn U.S. Pat. No. 5,775,166. It is contemplated that the present SMA system can be incorporated into either of these shifter systems. The disclosure of both of these two patents is hereby incorporated by reference in their entirety for their teachings.

It is important that sound and noise be minimized in vehicle interiors. In SMA actuators, since this is a metallurgical thermal phenomenon, it is desirable to manipulate the temperature so as to control the rate at which the phase transformation takes place. By carefully controlling the rise or drop in temperature, the present system can eliminate the need for many dampeners and can eliminate undesirable noise. This saves cost by eliminating the need for various means by which mechanical oscillations and impacts are dampened, such as by the addition of cushions and bumpers. Electronics allows dampening through current manipulation. Notably, the motion created as the SMA wire cools is relatively slow and "inherently" dampened, while the motion created as the SMA wire is heated from current flow can be much quicker, depending on the current flow.

It is contemplated that a scope of the present invention includes using the SMA wire in any application where a solenoid could be used, but where there is a desire to reduce complexity of components, and/or avoid electromagnetic fields, and/or avoid a component with the expense and size of a solenoid, and/or to avoid a clicking noise of an actuator or solenoid.

In the following discussion, new identification numbers are used to help provide a clear description, and to avoid confusion. However, it is contemplated that the features, characteristics, and functions of using the SMA wire in an actuator are also present in the structure described in this additional disclosure.

A shifter assembly 200 (FIG. 8) includes a molded base 201 for attachment to a vehicle (such as to a vehicle floor between front vehicle seats) and a shift lever 202 pivoted to the base 201. The illustrated base 201 is a polymeric molding, but it is contemplated that various bases can be used. The shift lever 202 includes a molded bottom 203 pivotally supported by a pivot pin 204 on the base 201, and further includes a tubular shaft 205 extending from the molded bottom 203, a hand grip 206 on the shaft 205, a pawl 207 for selectively engaging gear position notches (P park, R reverse, N neutral, D drive, etc.) in the base 201, a button 208 on the hand grip 206 for motivating an internal telescopingly-sliding straw 209' in the tubular shaft 205 to move the pawl 207 vertically. It is contemplated that the present inventive concepts can be incorporated into a wide variety of different shifter designs.

Figure 9:
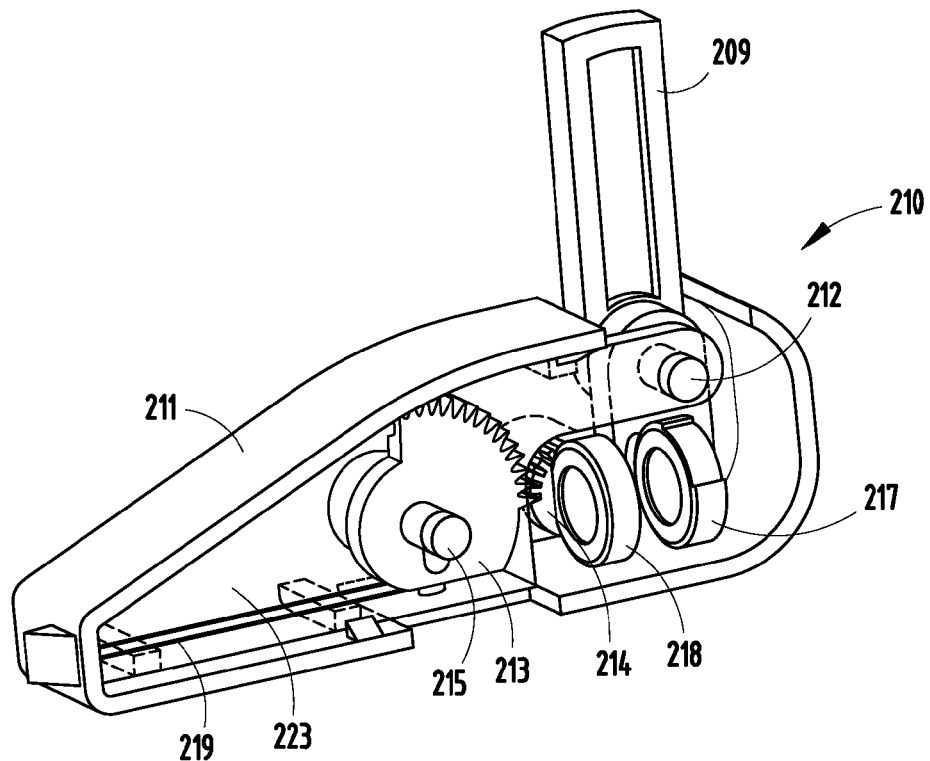
FIG. 9 is a perspective view of the lever-position-controlling component of FIG. 8, a side of the component being shown open to better reveal parts therein.
Figure 12:
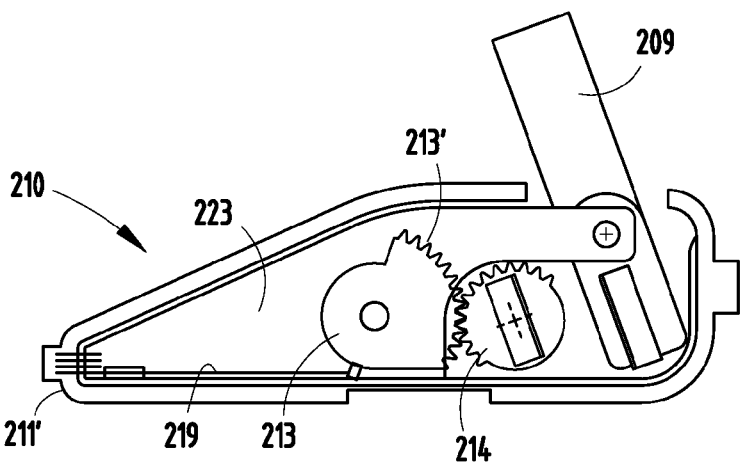

The illustrated lever-position-controlling component in FIG. 8 (and see FIGS. 9-10) is a pivoting blocking member 209 attached to the base 201 as part of a subassembly 210. The blocking member 209 is shown in a vertical (locking) position under the pawl 207 (FIGS. 8-10), locking the pawl 207 in the Park notch P, such that the shift lever 202 cannot be moved from the park position. The blocking member 209 is movable to a pivoted position (see FIG. 12) where it does not block vertical movement of the pawl 207 . . . thus allowing the vehicle driver to press the button 208 and cause the pawl 207 to move out of the park notch P . . . thus allowing the driver to shift the shift lever 202 between gear positions (P, R, N, D, etc.).

The subassembly 210 (FIGS. 10 and 13-18) includes a housing 211 configured for secure attachment to the base 201, such as by attachment tabs 211'. The blocking member 209 is pivoted to the housing 211 at location 212. Gears 213 and 214 include intermeshing teeth 213' and 214', respectively, that form a drive assembly, and are pivoted at locations 215 and 216 to the housing 211. First and second permanent magnets 217 and 218 are attached to the blocking member 209 and gear 214. The magnets 217 and 218 are preferably permanent magnets, such as rare earth magnets selected from neodymium type magnets or samarium cobalt type magnets. A shape memory alloy wire 219 is positioned along a bottom of the housing 211, and includes a loop end 220 that engages a protrusion 221 on the gear 213 and a contact end 222 that engages electrical contacts 222' at one end of the housing 211.

A circuit board 223 includes clamp connectors 223' for electrically and mechanically connecting to ends of the SMA wire. Additional connectors are provided on the circuit board for connecting to vehicle electrical power and to the control circuit 223' on the board. The circuit board 223 is positioned in the housing 211. A separate cover (not shown) can be used to cover the open side of the subassembly 210, or alternatively, the open side can be placed against a side wall of the shifter base 201. The circuit board 223 includes a many components as desired for control of the electrical current and timing thereof to the SMA wire 219. Typically, a processor will be included that is programmed to detect that the vehicle ignition switch is "on" and that the vehicle brake pedal is depressed, with these preconditions existing prior to current being applied to the SMA wire 219 to release the pawl 207 from the park position "P". The wire 219 and circuit board 223 form an actuator for operating the gears 213, 214 to move blocking member 209.

Figure 10:
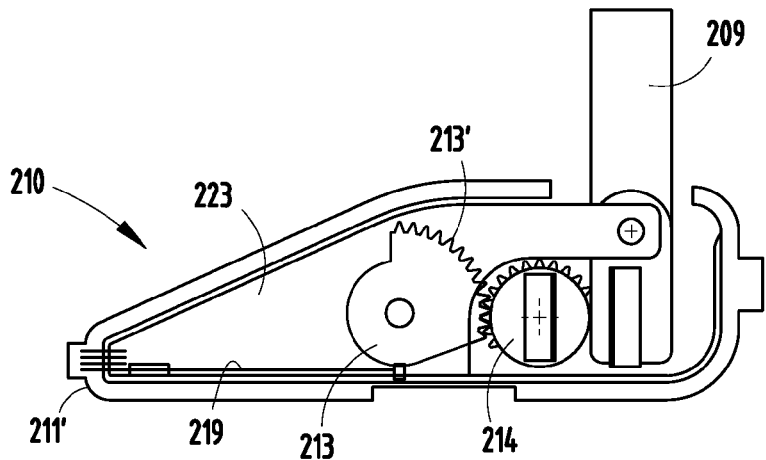
FIGS. 10-12 are side views of the lever-position-controlling component of FIG. 8, FIG. 10 showing the component in a locking position, FIG. 11 showing the component in a dynamic actuated position, and FIG. 12 showing the component in an unlocked release position.
Figure 11:
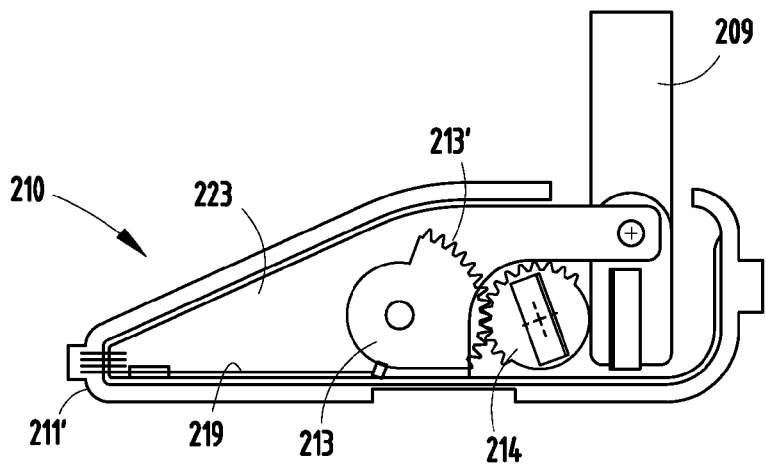

Specifically, the wire 219 changes length as electrical current is applied to the wire 219, causing the gears 213 and 214 to rotate. The magnets 217 and 218 are positioned in magnetic communication in a stable first position when the SMA wire is de-energized, thus holding the blocking member 209 in its locked blocking position (FIG. 10). When the wire 219 is energized and the gears 213, 214 are rotated about 20 to 30 degrees, the magnet 217 moves (see FIG. 11) to a position where magnet forces create a very unstable repelling condition with the magnet 218. As a result, the blocking member 209 is motivated to move to its release (unlocked) position (FIG. 12) with substantial magnetic repulsive forces. This is accomplished with relatively small movement of the magnets 217, 218 and with a low force to move the magnets 217, 218 . . . yet the force of repulsion is quite large and the three-dimensional space taken up by the design is surprisingly small and very compact.

Notably, the magnet arrangement offers several advantages. The magnet arrangement is generally not sensitive to thermal conditions often seen in vehicle passenger compartments such as heat and cold, and is generally not sensitive to electrical spikes and/or power loss often seen in vehicle electrical systems. Also, the magnet arrangement does not emit electromagnetic interference and there is no flyback energy from breakdown of the electromagnetic fields that is associated with common solenoids. Also, the blocking force is independent of the input voltage, and therefore it is generally much more stable than electromagnets through the working range of most electrical systems. Still further, since the working force is mechanically decoupled, the actuator can be sealed from debris and is also less susceptible to liquid spill through its non-contact design. This also enables mechanical override flexibility and eliminates the need for strain relief when used in combination with SMA wire. The magnet arrangement has very low load and travel requirements, which makes it ideally suited for use with SMA wire. As noted above, the present arrangement eliminates the need for a mechanical fuse since the "fuse" function is integral to the magnet arrangement. Specifically, this design uses magnetic communication, and there is no mechanical coupling to the blocker mechanism. This makes a manual override for the blocker mechanism simple. It also provides strain relief when the blocker member is bound mechanically, such as by tension from the vehicle driver pulling/pushing on the pawl or shift lever.

The subassembly 210 is attached to the base 201 in a manner allowing it to control movement of the pawl 207 (by preventing the pawl 207 from moving out of the park notch until a brake pedal is depressed and the vehicle ignition is "on"). However, it is contemplated that the present subassembly 210 can be attached to the base 201 to abuttingly engage and prevent movement of the shift lever 202 (such as by holding the shift lever 202 in a forward position equivalent to the park notch position). Alternatively, the present subassembly 210 can be attached to a linkage for controlling movement of the pawl 207 (see FIG. 7). Notably, the present invention is not limited to use in a vehicle transmission shifter, but instead it is contemplated that the present inventive concepts can be used in any environment where the high magnetic forces generated by permanent magnets allow a very compact design yet that provide a good "kick" when initiating movement of a blocking member. For example, similar mechanisms are sometimes used on hotel door locks with magnetic access cards, where an initial high-force "kick" is required to initiate movement of the lock's deadbolt toward an unlocked position.

FIGS. 19-33 are schematic drawings showing modified shifters with modified lever-position-controlling components. In FIGS. 19-33, similar and identical components, features, and characteristics are identified using a same number, but with the addition of a letter "A," "B," "C," etc. This is done to reduce redundant discussion.

The subassembly 210A (FIG. 19) uses three magnets 217A, 218A and 230A, with the first and second magnets 217A and 218A (upon rotation of the gears 213A and 214A) providing a force to cause the blocking member 209A to move from the locking position to the unlocking position, and with the first and third magnets 217A and 230A helping maintain that position. As the gears 213A and 214A are re-rotated toward their home position, the first and third magnets 217A and 230A (previously positioned to attract each other) begin to repel each other (as the magnets are moved about 20 to 30 degrees), and soon the first and second magnets 217A and 218A are positioned to attract each other and hence help hold the locking position of the blocking member 209A.

Figure 20:
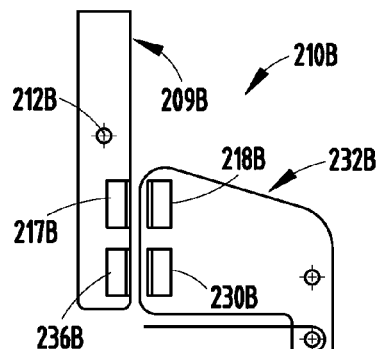
Figure 21:
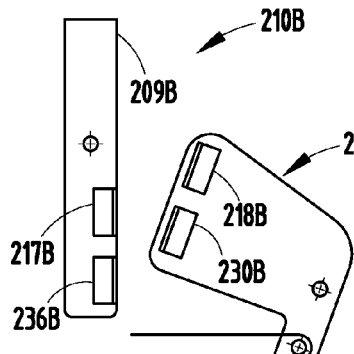
Figure 22:
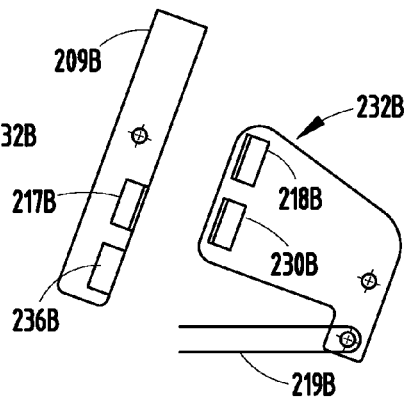
Figure 23:
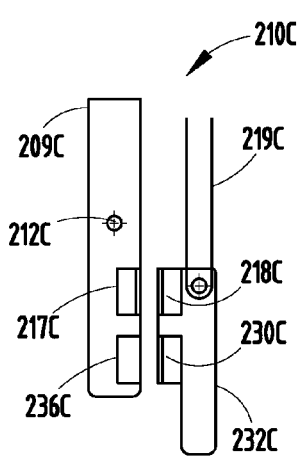
Figure 24:
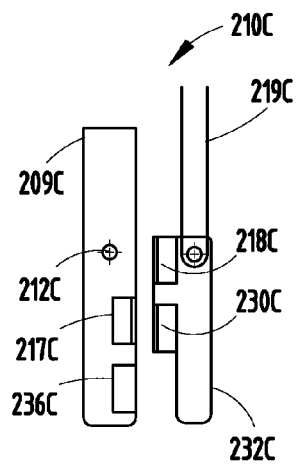
Figure 25:
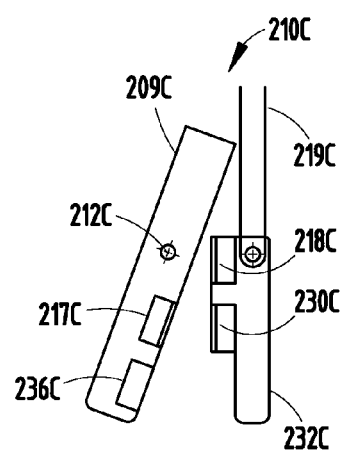
Figure 26:
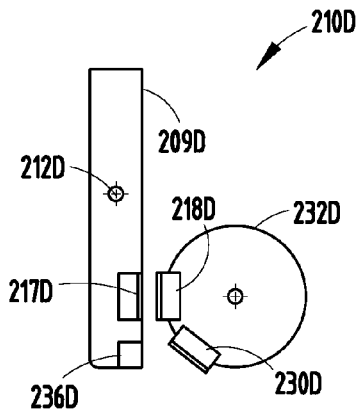

FIGS. 20-22 show a configuration similar to subassembly 210A, except the subassembly 210B in FIGS. 20-22 includes a carrier cam 232B carrying the magnets 218B and 230B. The loop end 220B of the SMA wire 219B acts directly on a leg of the cam 232B to move the magnets 218B and 230B between a locked first position where the magnets 217B and 218B attract, and an unlocked second position where the magnets 217B and 230B attract. Notably, the magnets 217B, 218B and 230B combine to create unstable repelling condition when the blocking member 209B is "halfway" between the first and second positions, which helps avoid the blocking member 209B from staying in a partial "halfway" position. A hall effect sensor 236B is positioned on the cam 232B in a position where it passes near the magnets 218B and 230B, such that it can sense the cam's position based on a position of the magnets 218B and 230B.

The subassembly 230C (FIGS. 23-25) replaces the carrier cam 232B with a linearly sliding carrier member 232B connected to the SMA wire 219C. The subassembly 230D (FIG. 26) replaces the cam with a rotating carrier wheel 232C connected to the SMA wire 219D.

Figure 27:
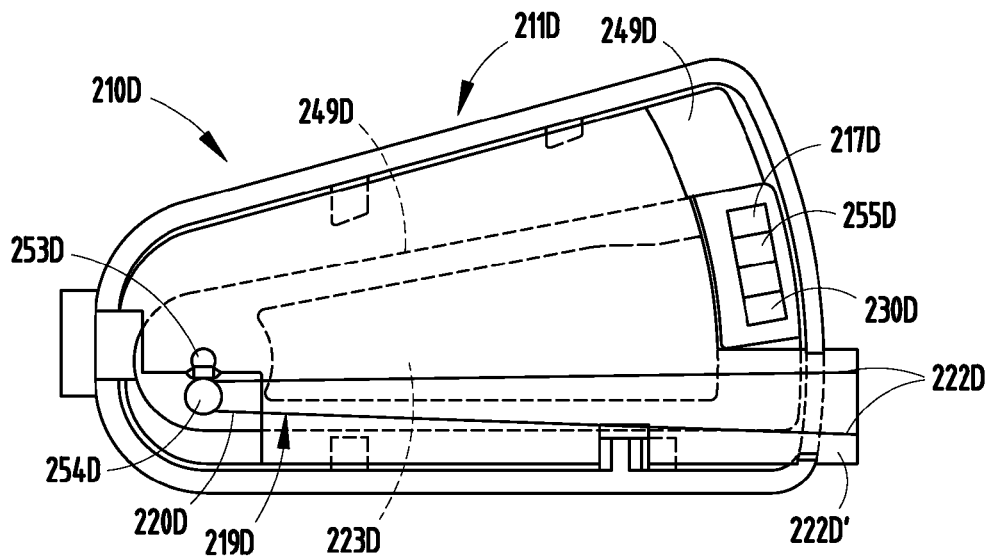
FIG. 27 is a side view of another modified subassembly for controlling shift lever position.
Figure 28:
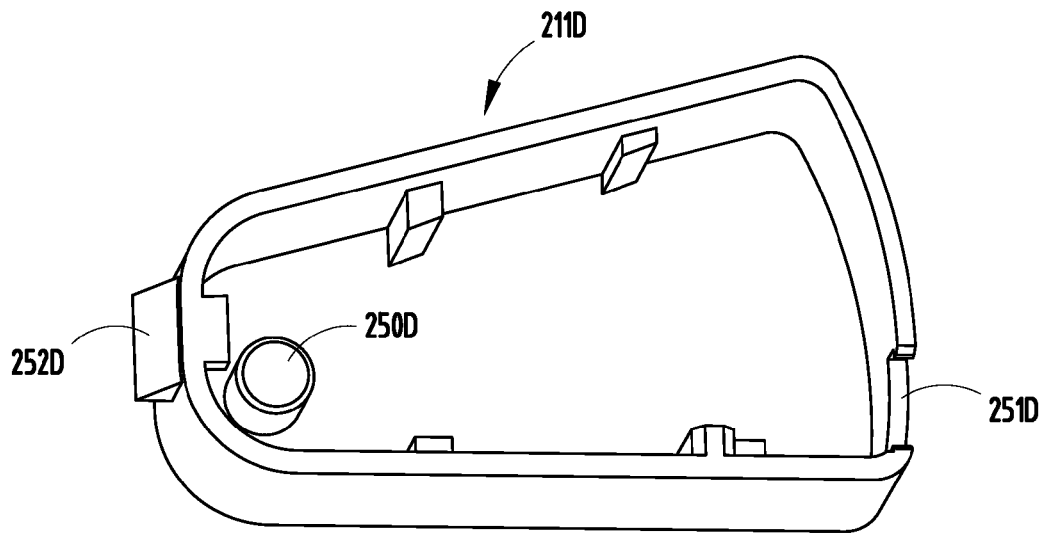
FIGS. 28-29 are perspective views of the housing and blocking member shown in FIG. 27.
Figure 29:
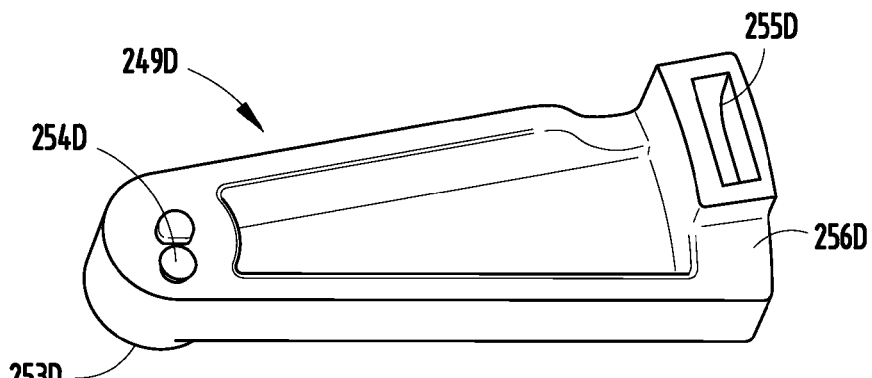
Figure 30:
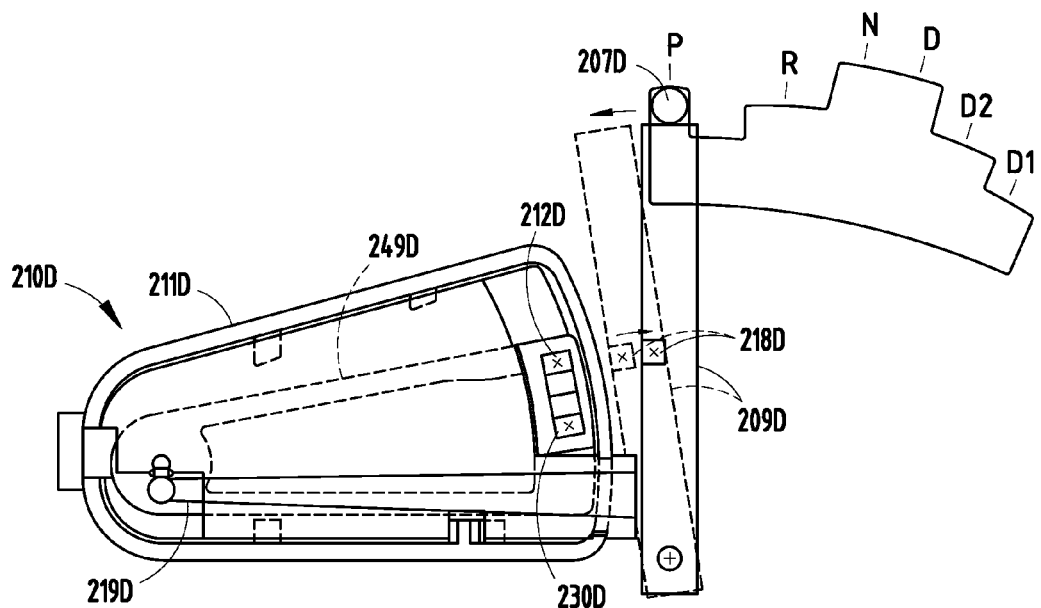
FIGS. 30-31 are side views of the modified subassembly of FIG. 27 incorporated into a shifter, FIG. 30 showing the shift lever's pawl locked in a park position, and FIG. 31 showing the pawl unlocked so that the shift lever is movable to different gear positions.

FIG. 27 is a side view of another modified shift-lever-position-controlling subassembly 210D for controlling the position of a shift lever. The subassembly 210D includes a housing 211D (FIG. 28) with a recessed area including an integral pivot boss 250D at one end and a location 251D for receiving an electrical connector at the other end. Also, the housing 211D includes attachment tabs 252D (or attachment flanges, etc.) to facilitate connection to a shifter base. A drive member 249D (FIG. 29) includes a pivot socket 253D at one end for rotatably engaging the pivot boss 250D, a stud 254D adjacent the pivot socket 253D, and includes a second end with a configured section having a recess 255D and a cutaway 256D. The SMA wire 219D (FIG. 27) includes a loop end 220D that wraps around the stud 254D and includes contact ends 222D that extend to the cutaway 256D, where they connect with electrical contacts 222D' on the circuit board 223D. The cutaway 256D provides space for the SMA wire 219D when the blocking member 209D is pivoted within the housing 211D (due to actuation of the SMA wire 219D). First and second magnets 217D and 230D are positioned in the recess 255D, and a third magnet 218D is positioned on a blocking member 209D (FIG. 30). The blocking member 209D is pivoted to a shifter base at location 248D. The blocking member 209D can be spring biased to a normal pawl-blocking position if desired. The pawl 207D is movable between park position P, reverse gear position R, neutral gear position N, drive position D, second gear position D2, and first gear position D1. It is contemplated that the present inventive concepts can also be used on shifters with alternative gear positions and gear sequences.

Figure 31:
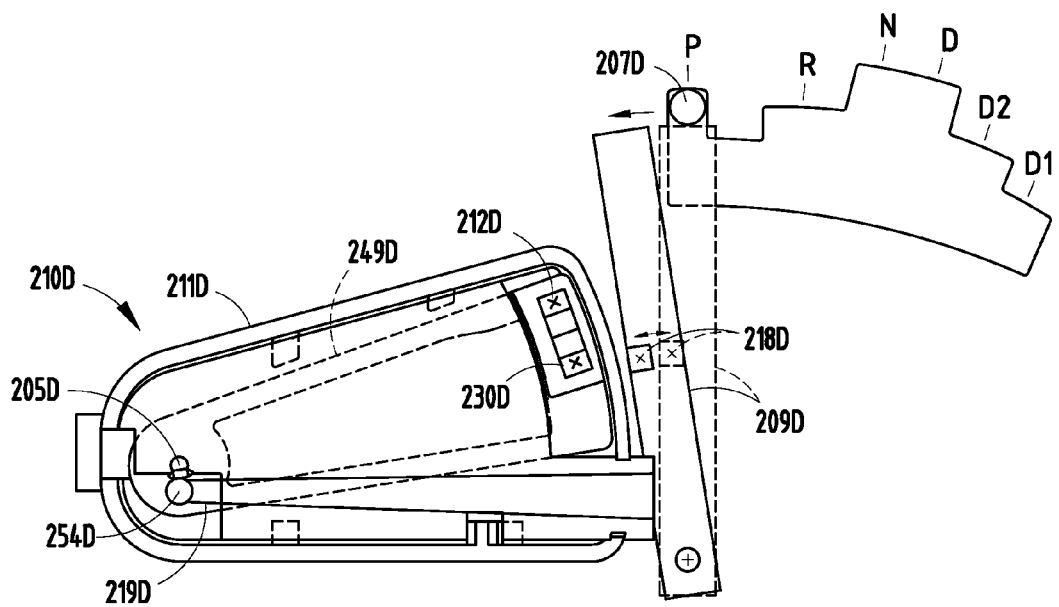

FIGS. 30-31 are side views of a shifter incorporating the modified subassembly 210D of FIG. 27 incorporated into a shifter. FIG. 30 shows the shift lever's pawl 207D locked in a park position P, and FIG. 31 shows the blocking member 209D moved to an unlocked/release position so that the pawl 207D is unlocked so that the shift lever is movable to different gear positions. In FIG. 30, the magnets 217D and 230D magnetically repel, holding the blocking member 209D in a stable pawl-locking position where movement of the shift lever is controlled (i.e., the shift lever is locked/held in its park position P). In FIG. 30, the SMA wire 219D is not actuated (i.e., electrical current is not flowing through the wire). In FIG. 31, the circuit board 223D senses from vehicle mounted sensors (i.e., a brake switch, and an ignition switch) that the vehicle's brake pad is depressed and that its ignition switch is turned on. Thus, the circuit on the circuit board 223D passes electrical current through the SMA wire 219D, causing a phase change that shortens the wire 219D. This in turn causes the drive member 249D to rotate, moving the magnet 217D away from the magnet 230D and moving the magnet 218D close to the magnet 230D. The magnet 218D is positioned with a reverse polarity compared to magnet 217D. Thus, as the magnet 217D moves away, the magnetic repelling forces between magnets 217D and 230D is lost. As the magnet 218D is moved close to magnet 230D, there is a strong magnetic attraction. This pulls the blocking member 209D away from the pawl-locking position (FIG. 30) and drives it toward an unlocked/release position (FIG. 31). A spring can be used to bias the blocking member 209D to a preferred home position.

It is contemplated that a modified subassembly can be constructed similar to FIG. 27 and incorporated into a shifter with a modified blocking member, where the magnetic polarity of magnet is reversed from magnet 218D in FIG. 27. (In other words, the replacement" magnets would attract to hold the blocking member in a pawl-blocked shift-lever-locked park position, . . . and the magnets would repel when positioned in front of each other.) Nonetheless, the function and operation is very similar to that shown in FIGS. 30-31. In particular, the modified blocking member would be pivoted at a pivot point located between a magnet on its lower end and its pawl-engaging upper end. The blocking member would be held in a park locking position by attraction of magnets such that the shift lever's pawl is locked in the park position. The blocking member 209E would be held in an unlocked pawl-releasing position by repulsion of magnets so that the shift lever is movable to different gear positions.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. In a park lock/brake transmission shift interlock apparatus including a base, a shifter including a shift lever pivoted to the base for movement between a plurality of gear positions including a park position, a pawl on the shift lever selectively engageable with notches on the base to control movement of the shift lever between the gear positions, at least one lever-position-controlling component, and a control circuit for controlling operation of the shifter based on predetermined vehicle conditions being met, an improvement comprising:

an actuator for operating the at least one lever-position-controlling component, the actuator incorporating shape memory alloy wire operably connected to the control circuit and to a drive member for operating the lever-position-controlling component for locking the shift lever in a selected one of the gear positions until the predetermined vehicle conditions are met, the actuator being configured to move the drive member between shifter-locked and shifter-unlocked positions.

2. The apparatus defined in claim 1, wherein the actuator is operably connected to the pawl for moving the pawl between a locking position where the pawl is engaged with a selected one of the notches, and a release position where the pawl is permitted to retract to allow movement of the shift lever between the gear positions.

3. The apparatus defined in claim 2, wherein the at least one lever-position-controlling component includes a linkage for moving the pawl between a first position where the pawl engages a selected one of the notches, and a second position disengaging the pawl to allow movement of the pawl and hence movement of the shift lever between the gear positions, the actuator being connected to the linkage for actuating the linkage.

4. The apparatus defined in claim 1, wherein the at least one lever-position-controlling component includes a blocking member for abuttingly locking the pawl in a selected position, the actuator being connected to the blocking member for moving the blocking member between a locking position retaining the pawl in a selected one of the notches and a release position allowing movement of the pawl out of the selected one notch to allow the shift lever to move between the gear positions.

5. The apparatus defined in claim 1, wherein the at least one lever-position-controlling component includes a blocking member for abuttingly holding the shift lever in a selected position, the shape memory alloy wire being looped around the drive member and operably connected to the blocking member for moving the blocking member between a locking position engaging the shift lever to retain the shift lever in a selected one of the gear positions and a release position allowing movement of the shift lever between the gear positions.

6. The apparatus defined in claim 1, including a strain relief mechanism connected to the shape memory alloy wire to prevent damage to the shape memory alloy wire when the actuator is energized to move the at least one lever-position-controlling component at a time when the lever-position-controlling component cannot move.

7. The apparatus defined in claim 6, wherein the strain relief mechanism is connected to the pawl and includes a pawl housing, a first spring biasing the pawl to extend from the pawl housing, and a second spring operably connected between the wire and the pawl, the second spring being configured to compress when the wire is operated to retract the pawl at a time when the pawl cannot be retracted.

8. The apparatus defined in claim 1, wherein the drive member provides a mechanical advantage so that a change in length of the shape member alloy wire results in an amplified movement of an operative end of the drive member.

9. The apparatus defined in claim 1, including a compensating device associated with the shape memory alloy wire and configured to allow the shape memory alloy wire to change length without forcing movement of the lever-position-controlling component.

10. The apparatus defined in claim 9, wherein the compensating device is configured to store energy from the shape memory alloy wire until such time as the stored energy can be used to move the lever-position-controlling component.

11. The apparatus defined in claim 9, wherein the compensating device includes an arrangement of magnets.

12. A method of controlling a vehicle shifter having a battery-powered vehicle electrical control system and lever-position-controlling components, comprising steps of:
    passing controlled amounts of electrical current from the vehicle electrical control system through a shape memory alloy wire actuator to change a length of the shape memory alloy wire actuator based on current flow and material phase change in order to control movement of at least one of the lever-position-controlling components between shifter-locked and shifter-unlocked locations.

13. The method defined in claim 12, including connecting a strain relief mechanism to the shape memory alloy wire actuator to protect the shape memory alloy wire actuator even when the shape memory alloy wire actuator is operated to change a length of the shape memory alloy wire actuator at a time when the at least one lever-position-controlling component cannot move.

14. The method defined in claim 12, including an arrangement of magnets arranged to absorb energy when the shape memory alloy wire actuator is energized at a time when the one lever-position-controlling component cannot move.

15. The method defined in claim 12, wherein the step of connecting includes connecting the shape memory alloy wire to a drive member, where the drive member has an operative end configured to move a greater distance than the change in the length of the shape memory alloy wire actuator in order to more responsively control movement of the at least one of the lever-position-controlling components between the shifter-locked and shifter-unlocked locations.

16. In a park lock/brake transmission shift interlock apparatus including a base, a shifter including a shift lever pivoted to the base for movement between a plurality of gear positions including a park position, at least one lever-position-controlling component, and a control circuit for controlling operation of the shifter based on predetermined vehicle conditions being met, an improvement comprising:
    an actuator for operating the at least one lever-position-controlling component, the actuator incorporating shape memory alloy wire operably connected to the control circuit and to the lever-position-controlling component for locking the shift lever in a selected one of the gear positions until the predetermined vehicle conditions are met.

17. The apparatus defined in claim 16, wherein the at least one lever-position-controlling component includes a blocking member for abuttingly locking a pawl in a selected position, the actuator being connected to the blocking member for moving the blocking member between a locking position retaining the pawl in a selected one of the notches and a release position allowing movement of the pawl out of the selected one notch to allow the shift lever to move between the gear positions.

18. The apparatus defined in claim 16, including a compensating device associated with the shape memory alloy wire and configured to allow the shape memory alloy wire to change length without forcing movement of the lever-position-controlling component.

19. The apparatus defined in claim 18, wherein the compensating device is configured to store energy from the shape memory alloy wire until such time as the stored energy can be used to move the lever-position-controlling component.

20. The apparatus defined in claim 18, wherein the compensating device includes an arrangement of magnets.

21. In a park lock/brake transmission shift interlock apparatus including a base, a shift lever pivoted to the base for movement between a plurality of gear positions including a park position, a pawl on the shift lever selectively engageable with notches on the base to control movement of the shift lever between the gear positions, at least one lever-position-controlling component, and a control circuit for controlling operation of the shifter based on predetermined vehicle conditions being met, an improvement comprising:
    an actuator for operating the at least one lever-position-controlling component, the actuator incorporating shape memory alloy wire operably connected to the control circuit and to the lever-position-controlling component for locking the shift lever in a selected one of the gear positions until the predetermined vehicle conditions are met; and
    a compensating device associated with the shape memory alloy wire and configured to allow the shape memory alloy wire to change length without forcing movement of the lever-position-controlling component;
    the compensating device including an arrangement of magnets.

22. A method of controlling a shifter having lever-position-controlling components, comprising a step of:
    passing controlled amounts of electrical current through the shape memory alloy wire actuator to change a length of the shape memory alloy wire actuator based on current flow and material phase change in order to control a position of at least one of the lever-position-controlling components; and
    including an arrangement of magnets arranged to absorb energy when the shape memory alloy wire actuator is energized at a time when the one lever-position-controlling component cannot move.

23. In a park lock/brake transmission shift interlock apparatus including a base, a shift lever pivoted to the base for movement between a plurality of gear positions including a park position, at least one lever-position-controlling component, and a control circuit for controlling operation of the shifter based on predetermined vehicle conditions being met, an improvement comprising:

an actuator for operating the at least one lever-position-controlling component, the actuator incorporating shape memory alloy wire operably connected to the control circuit and to the lever-position-controlling component for locking the shift lever in a selected one of the gear positions until the predetermined vehicle conditions are met; and a compensating device associated with the shape memory alloy wire and configured to allow the shape memory alloy wire to change length without forcing movement of the lever-position-controlling component;

the compensating device including an arrangement of magnets.

24. The apparatus defined in claim 16, wherein the actuator includes a drive member operably connected to the shape memory alloy wire, the drive member providing a mechanical advantage so that a change in length of the shape member alloy wire results in an amplified movement of an operative end of the drive member.

* * * * *